US008863452B1

(12) United States Patent
Hay, III et al.

(10) Patent No.: US 8,863,452 B1
(45) Date of Patent: Oct. 21, 2014

(54) TRIM FOR MOUNTING EXTERIOR COVERINGS FOR WINDOWS

(71) Applicant: Hawkes Design and Consulting, LLC, Charleston, SC (US)

(72) Inventors: Henry M. Hay, III, Charleston, SC (US); Bruce A. Weber, Summerville, SC (US)

(73) Assignee: Hawkes Design & Consulting, LLC, Charleston, SC (US)

(*) Notice: Subject to any disclaimer, the term of this patent is extended or adjusted under 35 U.S.C. 154(b) by 0 days.

(21) Appl. No.: 13/829,074

(22) Filed: Mar. 14, 2013

(51) Int. Cl.

| | |
|---|---|
| ***E06B 3/26*** | (2006.01) |
| ***E06B 3/964*** | (2006.01) |
| ***E06B 3/988*** | (2006.01) |
| ***E06B 3/68*** | (2006.01) |
| ***E05B 65/04*** | (2006.01) |
| ***E06B 3/32*** | (2006.01) |
| ***B60J 5/04*** | (2006.01) |
| ***E06B 9/00*** | (2006.01) |

(52) U.S. Cl.
CPC ........................................ *E06B 9/00* (2013.01)
USPC .... 52/202; 52/204.62; 52/204.63; 52/204.67; 52/204.7; 49/57; 49/61; 49/62; 49/463; 49/502

(58) Field of Classification Search
CPC ............................. E06B 9/02; E06B 2009/005
USPC ........... 52/204.62–204.67, 204.7, 202; 49/57, 49/61, 62, 463, 502
See application file for complete search history.

(56) References Cited

U.S. PATENT DOCUMENTS

| | | | | |
|---|---|---|---|---|
| 4,320,161 | A * | 3/1982 | Redman | 428/122 |
| 4,333,284 | A * | 6/1982 | Meadows | 52/222 |
| 4,368,594 | A * | 1/1983 | Milam et al. | 49/67 |
| 4,562,666 | A * | 1/1986 | Young, III | 49/62 |
| 5,096,753 | A * | 3/1992 | McCue et al. | 428/31 |
| 5,553,422 | A * | 9/1996 | Gazaway | 52/204.53 |
| 5,857,298 | A * | 1/1999 | Fullwood | 52/202 |
| 6,195,948 | B1 * | 3/2001 | Lamanna | 52/200 |
| 6,230,455 | B1 * | 5/2001 | Arehart et al. | 52/202 |
| 7,069,700 | B2 * | 7/2006 | Heissenberg | 52/202 |
| 8,196,363 | B2 | 6/2012 | Hay et al. | |
| 8,302,354 | B2 * | 11/2012 | Quesada | 52/215 |
| 8,438,802 | B1 | 5/2013 | Hay et al. | |
| 2006/0010792 | A1 * | 1/2006 | Biggers | 52/202 |
| 2007/0000193 | A1 * | 1/2007 | Beaupre et al. | 52/202 |
| 2007/0107328 | A1 * | 5/2007 | Munch | 52/202 |
| 2007/0143961 | A1 | 6/2007 | Weber | |
| 2008/0190070 | A1 | 8/2008 | Duncan et al. | |
| 2008/0196317 | A1 | 8/2008 | Duncan et al. | |
| 2009/0090062 | A1 * | 4/2009 | Pandorf | 49/50 |
| 2009/0183447 | A1 | 7/2009 | Hay, III et al. | |
| 2009/0229216 | A1 | 9/2009 | Duncan et al. | |
| 2009/0241421 | A1 | 10/2009 | Hay, III et al. | |
| 2009/0252557 | A1 * | 10/2009 | Fisher | 405/107 |
| 2010/0000181 | A1 | 1/2010 | Duncan et al. | |
| 2010/0186641 | A1 | 7/2010 | Hay, III et al. | |

* cited by examiner

*Primary Examiner* — Phi A
*Assistant Examiner* — Omar Hijaz
(74) *Attorney, Agent, or Firm* — Michael A. Mann; Nexsen Pruet, LLC

(57) ABSTRACT

A storm trim for holding a panel over a window for protection against impact of objects carried by wind during a storm. The storm trim includes a lineal cap and a lineal base. The base may be used with a window frame, incorporated into a window frame or be used in glazing surrounds or shutters. The base carries a stacked screw boss to receive and securely hold the anchoring screws that are needed to hold the panel over the window. The anchoring screws do not extend through the lineal base but remain within it. When the storm trim is not in use, the cap covers the lineal base.

20 Claims, 5 Drawing Sheets

TRIM FOR MOUNTING EXTERIOR COVERINGS FOR WINDOWS

BACKGROUND OF THE INVENTION

From time to time, coastal areas may experience strong winds such as during hurricanes and tropical storms. Strong winds can lift and hurl objects with sufficient force to break windows. Windows broken during a hurricane admit volumes of rain that does further damage. Moreover, volumes of wind entering a broken window increase internal pressures in the residence that can cause it to come apart. Window damage from strong winds may be mitigated, however, by impact-resistant window construction or by placing a covering over the window prior to a storm.

One common type of covering for windows is a sheet of plywood but there are other coverings such as strong fabrics and panels made of metal or plastics such as LEXAN. Rigid coverings may be nailed or screwed to the window frame so as to cover the window pane. Fabrics may be fitted with grommets and then secured to the window frame by inserting anchoring screws through the grommet holes and into the framework of the residence.

SUMMARY OF THE INVENTION

The present invention is a storm trim, which is a lineal construction member for use around a pane of glass to serve as an receptacle for anchor screws that hold a panel adjacent to a window for protection of that window against impact of objects carried by strong winds. The lineal member includes an extruded vinyl base and an optional extruded vinyl cap. The present lineal member may be added to a window frame as a separate trim piece, may be part of the window frame itself, and may be incorporated into glazing surrounds for windows in doors, transoms and side lights. It may also be incorporated into a decorative vinyl shutter. The lineal base serves to receive and hold anchoring screws. The cap covers the lineal base, when the base is not in use, to enhance the exterior appearance of the window areas as well as to keep moisture and dirt out of the lineal base.

In particular, the lineal base includes a stacked screw boss to receive the anchor screws, to hold them fast within the lineal base and without further penetration into the house framing or other structure of the house. Importantly, anchor screws may be driven into the lineal base at any point along its length. Also, because the screw boss does not require or permit penetration of the anchor screws into the framework of the building, wood rot from water damage due to screw holes is avoided. In addition, the lineal cap prevents water intrusion into the lineal base.

The present storm trim may be made to match the exterior appearance of a residence or commercial building. For example, it may be selected to match the color of a vinyl window frame and be formed with a "J Channel" for receiving siding or be incorporated into a shutter or glazing surrounds of a door or side light so that it looks like part of the usual trim structures around windows.

Those familiar with window construction will readily appreciate the features and advantages of the present storm trim from a careful reading of the description of preferred embodiments herein, accompanied by the following drawings.

DETAILED DESCRIPTION OF PREFERRED EMBODIMENTS

Figure 1:
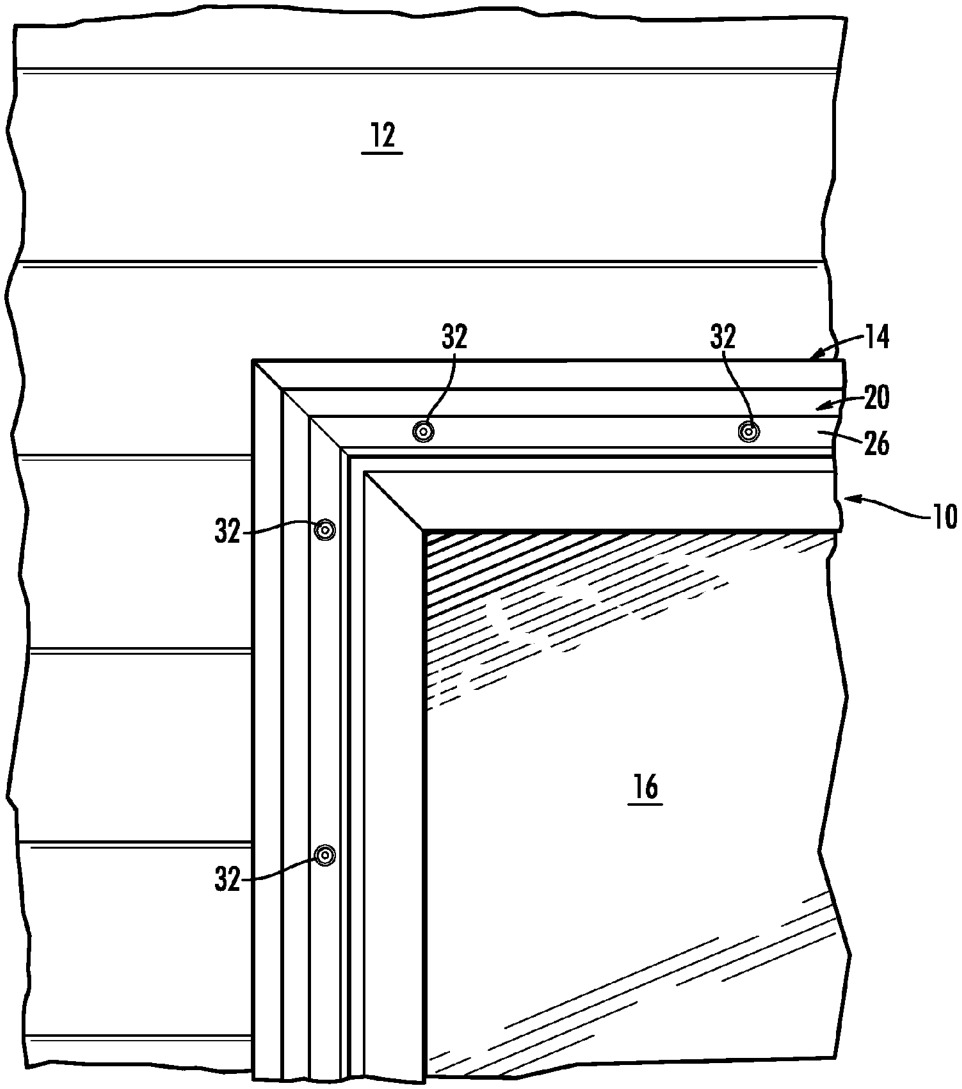
FIG. 1 is a partial drawing of a window of a residence according to an embodiment of the present invention.

Referring now to FIG. 1, there is shown the corner of a window 10 of a residence 12. Window 10 has a window frame 14 and a window pane 16. A storm trim 20 is shown incorporated into window frame 14. Storm trim 20 includes a lineal base 26 and a lineal cap 28 (best seen in FIGS. 4 and 5). In FIG. 1, lineal cap 28 is removed to show anchoring screws 32 inserted into lineal base 26 to hold a panel 22 that protects window pane 16 from impact caused by high winds.

The term "lineal" in lineal base 26 and lineal cap 28 refers to an extruded construction member having a uniform cross section perpendicular to its major dimension which major dimension is much longer than its other two dimensions; that is, the plane of any cross section perpendicular to the major dimension of lineal base 26 and lineal cap 28 is defined by a line parallel to the major dimension. Lineal base 26 and lineal cap 28 are made of a thermosetting polymer, such as vinyl. Lineal cap 28 serves to cover lineal base 26 and to keep moisture and dirt out of lineal base 26 when it is not being used to receive anchoring screws 32.

Figure 2:
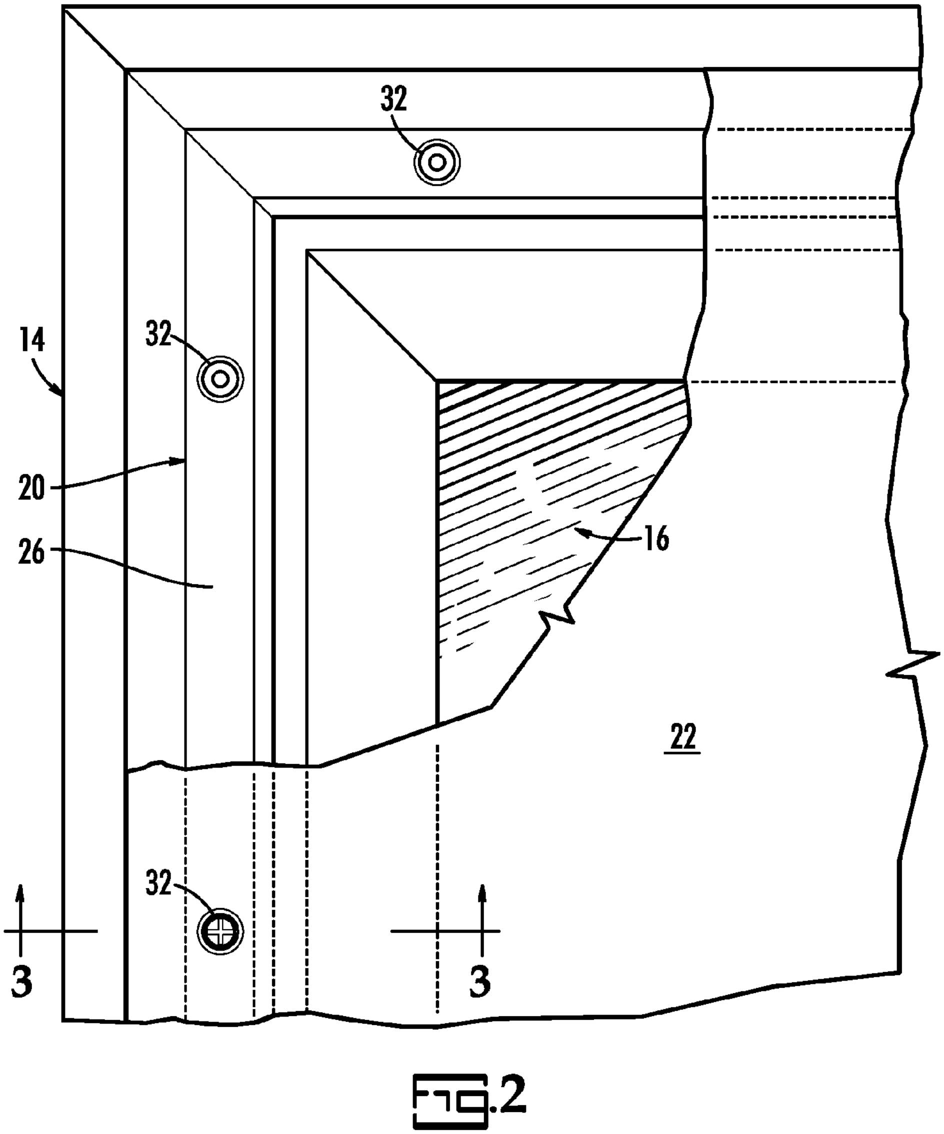
FIG. 2 is the partial drawing of a window of a residence of FIG. 1 showing a panel installed over the window frame and partially cut away to reveal the window behind the panel.

When high winds, such as those associated with a hurricane or tropical storm, are forecast, those homes or commercial residences that are equipped with the present storm trim 20 may use the time prior to the onset of the storm to cover exterior windows 10. When storm trim 20 is part of window frame 14, as illustrated in FIGS. 1 and 2, lineal cap 28 is removed from lineal base 26 and stored and then a panel 22 can be attached to window frame 14 using anchoring screws 32. Anchoring screws 32 may be inserted anywhere along lineal base because its cross section is uniform over that length. If holes have been pre-drilled in panel 12, anchoring screws 32 may be inserted into those pre-drilled holes and then inserted into lineal base 26.

Figure 3:
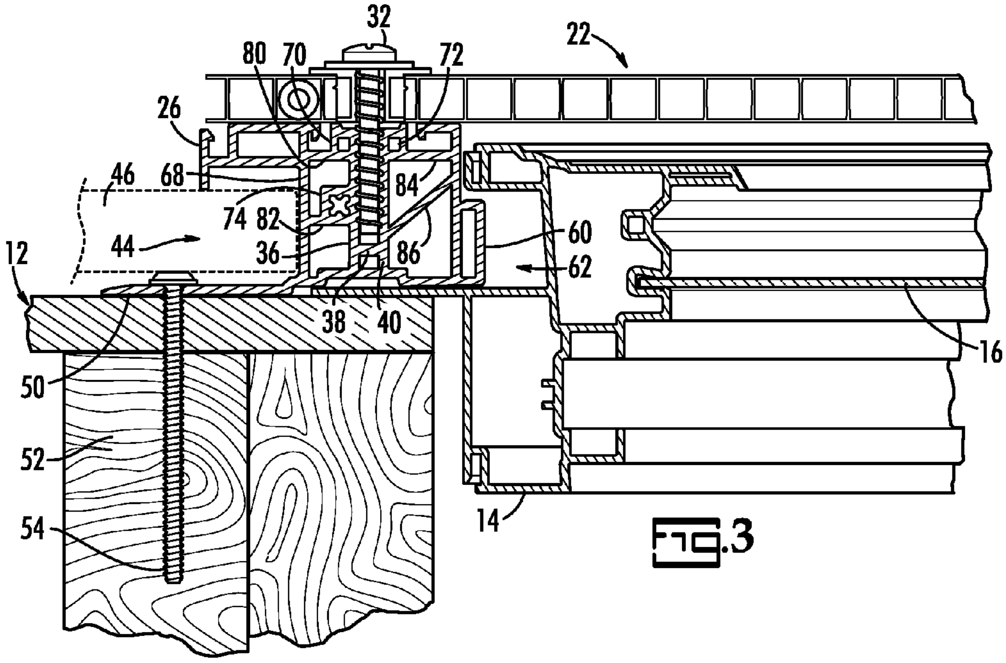
FIG. 3 is a cross-sectional view taken along lines 3-3 of FIG. 2, according to an embodiment of the present invention.

Lineal base 26 includes a stacked screw boss 36 for receiving anchoring screws 32. A screw boss is a channel or void defined by barriers 38 and walls 40 in an extrusion which accepts a certain diameter of anchoring screw 32. As seen in FIG. 3, the present stacked screw boss 36 is a series of channels or voids, one channel on top of the other with generally co-planar walls 40 and separated by a series of barriers 38. The stack of channels that comprises the stacked screw boss 36 accepts a long metal anchoring screw 32. The stacking of channels to form a stacked screw boss 36 provides increasing resistance with each additional screw boss to provide great holding power, holding power sufficient for very strong winds. The number of channels in a stacked screw boss 36 is at least two and may be as many as five. The holding power of stacked screw boss 36 is a function of the number of channels, the thickness of each barrier 38, the thickness and shape of the walls 40 of each channel, and the material of the stacked screw boss 36. Additionally, the cross sections of each channel need not be uniform. Some walls 40 may be formed to narrow so that additional resistance may be provided by lateral pressure of walls 40 on the threads of anchoring screws 32 in addition to the pressure applied as anchoring screw 32 advances through a succession of barriers in stacked screw boss 36. Importantly, stacked screw boss 36 is long enough (a stack of sufficient major dimension) so that anchoring screws remain within stacked screw boss 36 when fully seated and the ends of their threads do not penetrate beyond the final barrier 38.

Lineal base 26 with its stacked screw boss 36 may be integrated into various structures. For example, lineal base 26 may be part of a window frame as shown in FIGS. 1-3. Referring specifically to FIG. 3, there is shown panel 22 held to window frame 14.

The present storm trim 20 may include a J channel 44 to receive siding 46 and a nail fin 50 for attaching storm trim 20 to the framing 52 of residence 12 with nails or screws 54. Storm trim 20 may include a shoulder 60 to insert into the j-channel 62 of a window frame 14. When using the present storm trim 20 with windows with stronger frames, shoulder 60 may be easily removed along its preset indentation lines so that the body of storm trim 20 abuts window frame 14 directly. Aluminum-clad windows, wooden windows, and commercial store front glazing all have stronger frames than vinyl windows so the extra structural support provided by shoulder 60 is not needed.

Lineal base 26 may include structure for supporting stacked screw boss 36. For example, lineal base includes a housing 68 and may have extruded lineal beams 70, 72 on either side of the initial penetration of anchoring screws 32. Screw boss 74 is intended for use when two lineal bases 26 meet at a corner. When the storm trim is mitered such that two pieces form a corner, a screw is installed thru the boss in a normal direction and into the end of the boss in the mating piece to draw the two cut faces together in a clean-looking corner connection.

Housing 68 may also include lateral lineal supports 80, 82 and 84 to tie lineal beams 70, and 72 and screw boss to housing 68 and may have a diagonal support 86. These features give housing 68 of lineal base 26 rigidity and strength to hold stacked screw boss 36 against the pull of panel 22 on anchoring screws 32 during high winds.

Storm trim 20 shown in FIG. 3 is an example of storm trim 20 shown with one type of flat casing but various extrusions could be added to the accessory groove outside of housing 26 to allow storm trim 20 to be modified to look like other common flat window casings, such as 3×1.2 inch and 5½ inch flat casings.

Figure 4A:
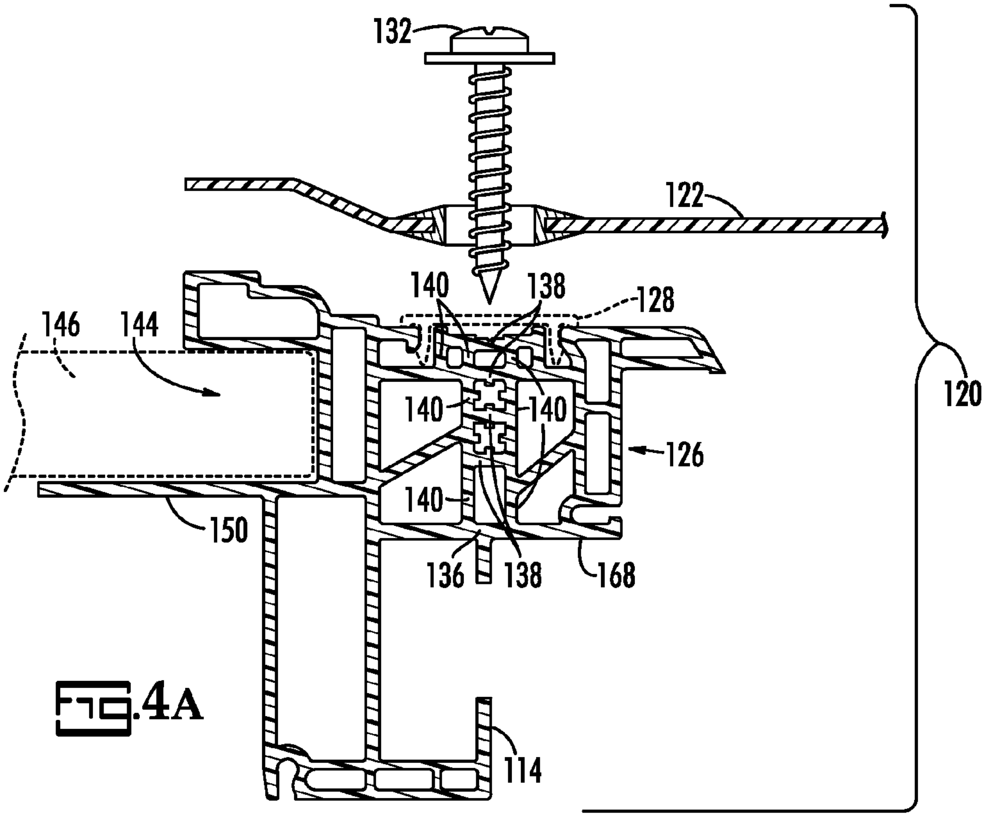
FIG. 4A is an exploded, cross-sectional view of a lineal base incorporated into the window frame of a window, according to an alternate embodiment of the present invention.
Figure 4B:
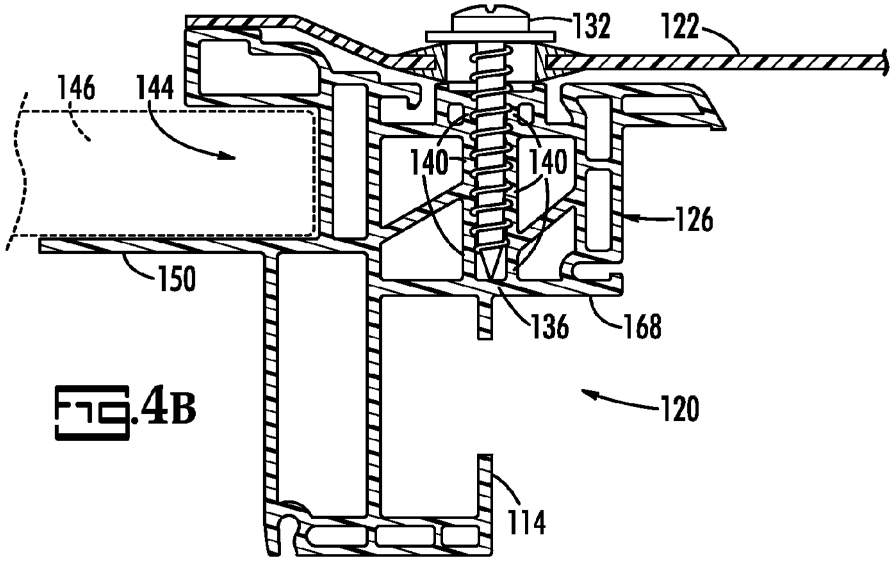
FIG. 4B is an assembled view of the lineal base of FIG. 4A.

Referring now to FIGS. 4A and 4B, which show an exploded, cross sectional view of a lineal base 126 and lineal cap 128 (shown in phantom lines) in a storm trim 120 that is integral with a window frame 114. Shown with storm trim 120 is a panel 122 and an anchoring screw 132. Lineal base 126 includes a J-channel 144 for receiving siding 146 and a nail fin 150 that may be used to attach storm trim 120 to residential or commercial framing as shown in FIG. 3.

Lineal base 126 also includes a housing 168 with a stacked screw boss 136 with four channels defined by a series of barriers 138 and walls 140. Stacked screw boss 136 is long enough so that anchoring screw 132 does not penetrate beyond its final barrier 138 when anchoring screw 132 is fully seated but remains inside stacked screw boss 136. Window frame 114 of course incorporates lineal base 132 in this embodiment and is not a separate element as shown in FIG. 3.

Figure 5A:
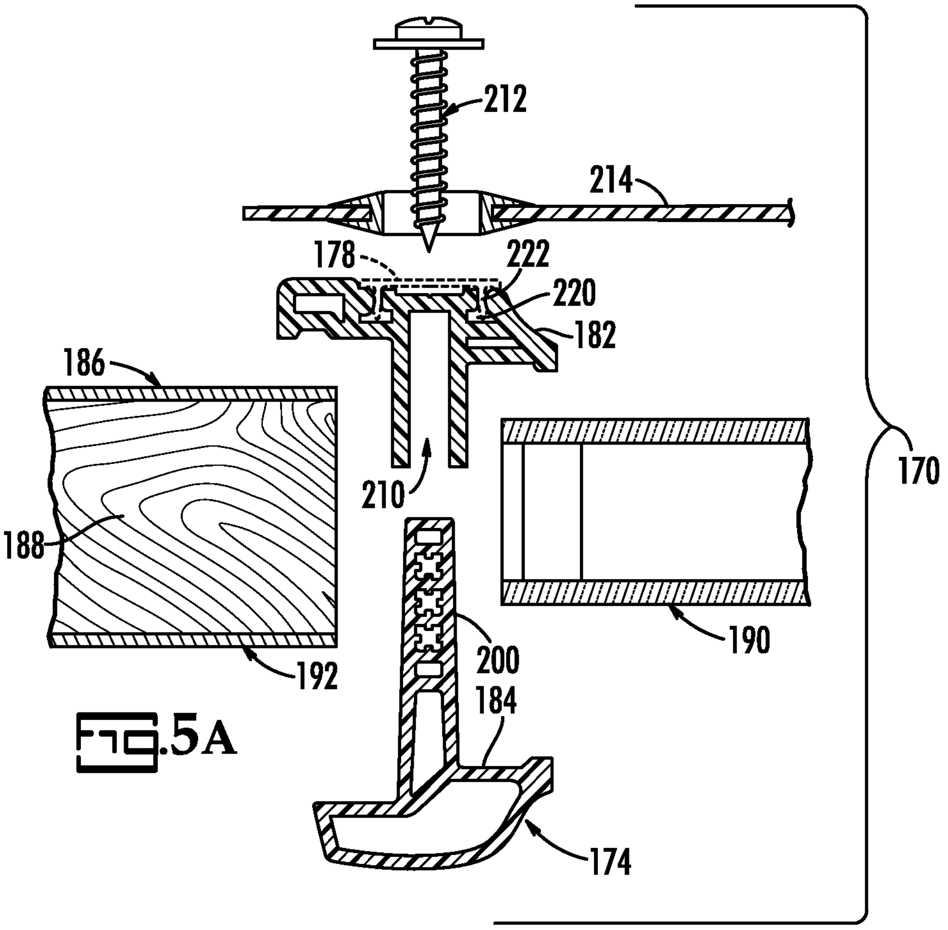
FIG. 5A is an exploded, cross sectional view of a lineal base incorporated into glazing surrounds of a window, according to an embodiment of the present invention.
Figure 5B:
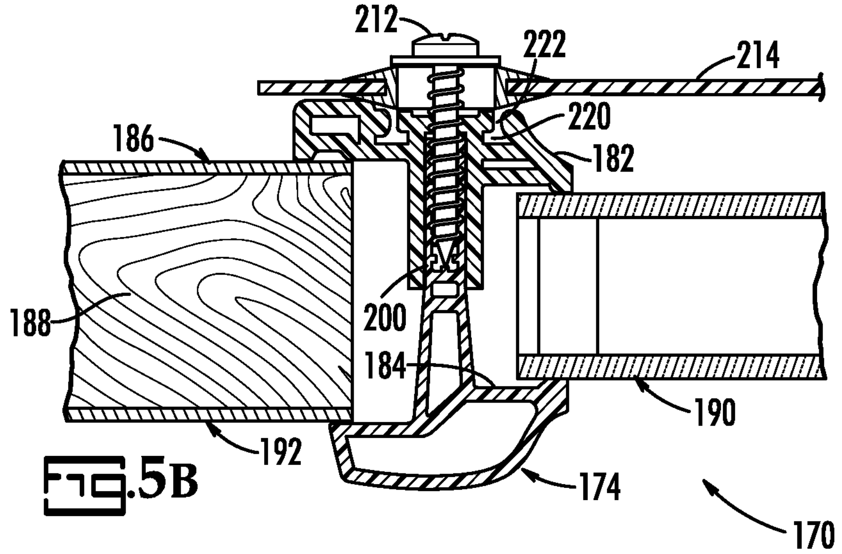
FIG. 5B is a cross-sectional view of the lineal base of FIG. 5A.

FIGS. 5A and 5B illustrate the present invention for use in a glazing surrounds such as a window in a door or a side light window next to a door or a transom window above a door. FIG. 5A illustrates storm trim 170 in an exploded view and, in FIG. 5B, in an assembled view. Storm trim 170 includes a lineal base 174 and a lineal cap 178. Lineal base 174 is made in two parts, a first part 182 and an opposing second part 184. First part 182 is applied to the front 186 of a door 188 and a window pane 190, in the illustrated example shown, and second part 184 is applied to the back 192 of door 188 and pane 190. In the specific example, second part 184 contains the stacked screw boss 200 and is inserted in a channel 210 in first part 182. Pushing second part 184 into first part 182 frictionally holds first and second parts 182, 184 together and window pane 190 to door 188.

After lineal cap 178 is removed, an anchor screw 212 may be inserted through a protective panel 214 into stacked screw boss 200. When anchoring screw 212 is fully seated, it does not penetrate through second part 184 but remains within lineal base 174.

Lineal base 174 includes two lineal grooves 220 and lineal cap 178 has two lineal legs 222. Lineal legs 222 of lineal cap 178 may be resiliently fitted into lineal grooves 220 of lineal base 174 to hold it place.

Those skilled in residential construction, particularly in areas prone to high winds, will appreciate that many modifications and substitutions can be made to the foregoing embodiments without departing from the spirit and scope of the present invention, which is defined by the appended claims.

What is claimed is:

1. A storm trim for use in attaching a panel over a window frame, comprising:

(a) a lineal base, said lineal base having a length and a depth, said lineal base having a stacked screw boss formed therein running perpendicular to said length and parallel to said depth, said stacked screw boss having a width and at least two channels, one channel of said at least two channels being on top of another channel of said at least two channels with generally co-planar walls and separated by a barrier, said stacked screw boss dimensioned for receiving anchoring screws at any point along said length and said depth of said lineal base and being dimensioned so that said anchoring screws, when seated in said stacked screw boss, remain within said screw boss and do not extend farther than said depth; and (b) a removable lineal cap dimensioned to cover said stacked screw boss and being attachable to said base from the exterior of a window, said lineal cap being removed prior to the onset of a storm in order to allow said anchoring screws to attach a panel to said stacked screw boss of said lineal base so that said lineal cap and said anchoring screws cannot both be in position on said lineal base at the same time.

2. The storm trim as recited in claim 1, wherein said lineal base is formed to have a J-channel for receiving siding of a residence.

3. The storm trim as recited in claim 1, wherein said lineal base is formed to have a shoulder for receiving a J-channel of a window.

4. The storm trim as recited in claim 1, wherein said lineal base is formed in two parts for receiving glazing there between, and further comprising fasteners to join said two parts after said glazing is received there between.

5. The storm trim as recited in claim 1, wherein said lineal base is made of extruded vinyl.

6. The storm trim as recited in claim 1, wherein said cap is made of extruded vinyl.

7. The storm trim as recited in claim 1, wherein said cap has two legs and said lineal base has two lineal grooves formed therein, and wherein said legs of said cap insert into said grooves of said lineal base.

8. The storm trim as recited in claim 1, wherein said stacked screw boss includes plural spaced-apart barriers.

9. The storm trim as recited in claim 8, wherein said stacked screw boss has at least two barriers.

10. The storm trim as recited in claim 8, wherein said stacked screw boss has at most five barriers.

11. A storm trim for attaching a panel over the exterior of a window, said storm trim comprising a lineal base, said lineal base having a length and a depth, said lineal base having (a) a stacked screw boss formed therein running perpendicular to said length and parallel to said depth, said stacked screw boss having a width and at least two channels, one channel of said at least two channels being on top of another channel of said at least two channels with generally co-planar walls and separated by a barrier;

(b) a lineal cap attached to said lineal base and covering said stacked screw boss;

(c) anchoring screws, said stacked screw boss dimensioned for receiving said anchoring screws into said lineal base at any point along said length and said depth of said lineal base, said lineal cap and said anchoring screws cannot both be in position on said lineal base at the same time, so that, after said lineal cap is removed from said lineal based, said anchoring screws are then insertable through a panel over the exterior of a window and into said stacked screw boss, said anchoring screws remaining within said screw boss and not extending farther than said depth of said lineal base; and (d) a shoulder insertable into a J-channel of a window frame.

12. The storm trim of claim 11, further comprising a J-channel for receiving siding.

13. The storm trim of claim 12, wherein said J-channel includes a nail fin.

14. The storm trim of claim 11, further comprising an interior brace.

15. The storm trim of claim 14, wherein said interior brace is a diagonal brace.

16. The storm trim of claim 11, further comprising an interior beam.

17. A storm trim for use in attaching a panel over a window pane, said storm trim comprising:

(a) a lineal base, said lineal base having a length and a depth, said lineal base having a stacked screw boss formed therein running perpendicular to said length and parallel to said depth, said stacked screw boss having a width and at least two channels, one channel of said at least two channel being on top of another channel of said at least two channels with generally co-planar walls and separated by a barrier, said stacked screw boss dimensioned for receiving anchoring screws at any point along said length and said depth of said lineal base and being dimensioned so that said anchoring screws, when seated in said stacked screw boss, remain within said screw boss and do not extend farther than said depth, said lineal base having a first portion, an opposing second portion, and screws to hold said portion and said second portion together with a window pane there between, said storm trim surrounding said window pane; and (b) a removable lineal cap covering said stacked screw boss and being attachable to said base from the exterior of said window pane, said lineal cap being removable prior to the onset of a storm in order to allow said anchoring screws to attach a panel to said stacked screw boss of said lineal base so that said lineal cap and said anchoring screws cannot both be in position on said lineal base at the same time.

18. The storm trim of claim 17, wherein a first part of said stacked screw boss is in said first portion and a second part of said stacked screw boss is in said second portion, said first and said second parts of said stacked screw boss being aligned when said screws hold said first and said second portions together.

19. The storm trim of claim 18, wherein said lineal cap covers said anchoring screws and said screws holding said first and said second portions together.

20. The storm trim of claim 19, wherein said stacked screw boss has at least two channels and not more than five channels.

* * * * *